US007484419B2

(12) United States Patent
Tsuda et al.

(10) Patent No.: US 7,484,419 B2
(45) Date of Patent: Feb. 3, 2009

(54) MOUNTING STRUCTURE OF PRESSURE SENSOR ELEMENT

(75) Inventors: Hiroshi Tsuda, Nagoya (JP); Fuminori Suzuki, Okazaki (JP)

(73) Assignee: DENSO CORPORATION, Kariya (JP)

( * ) Notice: Subject to any disclaimer, the term of this patent is extended or adjusted under 35 U.S.C. 154(b) by 1 day.

(21) Appl. No.: 11/637,072

(22) Filed: Dec. 12, 2006

(65) Prior Publication Data

US 2007/0169559 A1    Jul. 26, 2007

(30) Foreign Application Priority Data

Jan. 23, 2006    (JP) .............................. 2006-013580

(51) Int. Cl.
*G01L 7/00* (2006.01)
(52) U.S. Cl. ........................................ 73/756; 706/756
(58) Field of Classification Search ........... 73/700–756; 361/283.1–283.4
See application file for complete search history.

(56) References Cited

U.S. PATENT DOCUMENTS

| 5,159,525 | A | * | 10/1992 | Tate ........................ 361/283.1 |
| 5,595,939 | A | | 1/1997 | Otake et al. |
| 5,793,150 | A | * | 8/1998 | Kober et al. ................ 310/338 |
| 6,183,290 | B1 | | 2/2001 | Loibl |
| 6,212,955 | B1 | * | 4/2001 | Tanaka et al. ................ 73/718 |
| 6,227,055 | B1 | * | 5/2001 | Pitzer .......................... 73/715 |
| 6,453,747 | B1 | * | 9/2002 | Weise et al. ................... 73/715 |
| 6,612,202 | B2 | | 9/2003 | Thorum et al. |
| 6,619,132 | B2 | * | 9/2003 | Imai et al. ..................... 73/753 |
| 6,739,042 | B2 | | 5/2004 | Thorum |
| 7,176,541 | B2 | * | 2/2007 | Tanaka et al. ............... 257/419 |

OTHER PUBLICATIONS

Office Action dated Jul. 17, 2008 in corresponding German Patent Application No. 10 2007 003 446.8-52 (and English translation).

* cited by examiner

*Primary Examiner*—Andre J Allen
*Assistant Examiner*—Jermaine Jenkins
(74) *Attorney, Agent, or Firm*—Posz Law Group, PLC (57) ABSTRACT

A pressure sensor can be mounted to an object with a pressure to be measured by a mounting structure. The mounting structure includes bonding a first member and a second member, a medium passageway formed on one of the bonding face thereof, a flexible printed wiring board interposed between both bonding faces through gaskets, and a pressure sensor element electrically connected to the flexible printed wiring board by an electrically conductive member so that the sensor element electrically connects to the outside of the object. The pressure sensor element is disposed in a recess that is formed on the bonding face. The presser medium is transferred through an introduction hole from the medium passageway to the pressure sensor element.

13 Claims, 4 Drawing Sheets

MOUNTING STRUCTURE OF PRESSURE SENSOR ELEMENT

CROSS REFERENCE TO RELATED APPLICATION

This application is based on Japanese Patent Application No. 2006-13580 filed on Jan. 23, 2006, the disclosure of which is incorporated herein by reference.

BACKGROUND OF THE INVENTION

1. Field of the Invention

This invention relates to a mounting structure of a pressure sensor attached to an object, the object having a medium passageway for transmitting a pressure medium, the pressure of which is to be measured by the pressure sensor.

2. Description of Related Art

Conventionally, a pressure sensor, for example, that disclosed in U.S. Pat. No. 5,595,939 B2 (JP-A-Hei07-243926), includes a sensor element mounted in a case having a connector case and housing formed with a pressure introduction passageway. The pressure sensor element is connected electrically to the connector case by a bonding wire.

In conventional mounting structures such as described above, the case for the pressure sensor has a large physical size.

The projection of the pressure sensor's case is large and the total structure's size including the pressure sensor is large. In addition, the electric connection between the connector case and the pressure sensor element introduces complexity in the mounting structure.

SUMMARY OF THE INVENTION

The present invention has been conceived in view of the above problem, so that a mounting structure of a pressure sensor attached to an object having a pressure to be measured will be downsized and simplified, where the pressure sensor has a medium passageway.

The mounting structure of the pressure sensor according to an aspect of the present invention includes a first member and a second member bonded together, a medium passageway formed on one or more of the bonding faces thereof, a flexible printed wiring board interposed between both bonding face through gaskets, and a pressure sensor element electrically connected (for example, bonded ) to the flexible printed wiring board by an electrically conductive member so that the sensor element is electrically connected to an outside of the object having a pressure to be measured.

The pressure sensor element is disposed in a recess, the recess being formed on the bonding face, and the presser sensor element transmits pressure through an introduction hole for transferring a pressure medium from the medium passageway to the pressure sensor element.

Consequently, the object has the medium passageway on the bonding face of the first member and the second member. The flexible printed board having the pressure sensor element mounted thereon is interposed between the first member and the second member through the gasket. The pressure sensor element is disposed in the recess of the second member. Therefore, the present invention does not need a conventional case for receiving the pressure sensor.

Additionally, the pressure sensor element can monitor appropriate pressure by introducing a pressure medium from the medium introduction hole, which was provided in either gasket.

Accordingly, the present invention can provide a simplified and miniaturized component when the pressure sensor is mounted on the object with the pressure to be measured.

In such a constitution, if the medium passageway is formed on the bonding face of the first member, the medium introduction hole is formed on the gasket of the first member, then thereby communicating the medium introduction hole to the medium passageway of the first member.

According to this embodiment, a pressure medium can be introduced adequately from the medium passageway of the first member to the pressure sensor element.

In addition, in such a constitution, the pressure sensor element can be electrically connected to an electrical connecting member. For example in the situation that a pressure receiving face is between the flexible printed wiring board and opposite thereto, an opening portion is provided at the flexible printed wiring board for transferring the pressure medium from a medium introduction hole formed at the gasket of first member side to the pressure receiving face.

According to this embodiment, the pressure medium can be adequately introduced from the medium passageway of the first member side to the pressure receiving face of the pressure sensor element opposite to the flexible printed wiring board.

In addition, in such a constitution, when the medium passageway is provided on a bonding face of the second member, a medium passageway of the second member can be combined with a recess for receiving a pressure sensor element.

Even more particularly, when the medium passageway is provided on the bonding face of the second member, the pressure sensor element can be electrically connected to the electrical connecting member in the condition where the pressure receiving face is opposite to the flexible printed wiring board. An opening portion formed in the gasket of the second member side can be used as the medium introduction hole for introducing the pressure medium from the medium passageway of the second member.

Accordingly, the pressure medium can be adequately introduced from the medium passageway of the second member to the pressure receiving face of the pressure sensor element opposite to the flexible printed wiring board.

In addition, in the above constitution, if the electrical connecting member between the pressure sensor element and the flexible printed wiring board is sealed by insulating material, it is expected that joining (for example, bonding or sealing) strength is reinforced and insulation characteristics are improved.

BRIEF DESCRIPTION OF THE DRAWINGS

The above and other objects, features and advantages of the present invention will become more apparent from the following description of the preferred embodiments given with reference to the attached drawings, wherein.

DETAILED DESCRIPTION OF THE PREFERRED EMBODIMENTS

One or more exemplary embodiments of a mounting structure for a pressure sensor and method for manufacturing will be described with reference to the appended claims and drawings, all of which form part of this application. In the drawings, identical portions or corresponding portions are identified with the same numerals to eliminate redundant explanation.

A First Embodiment

A first embodiment is illustrated in connection with FIG. 1 to FIG. 4, including an overview illustrating a pressure sensor mounted to an example object, a detailed sectional view of the structure, a plan view of the structure, and an exploded view of the structure.

Figure 1:
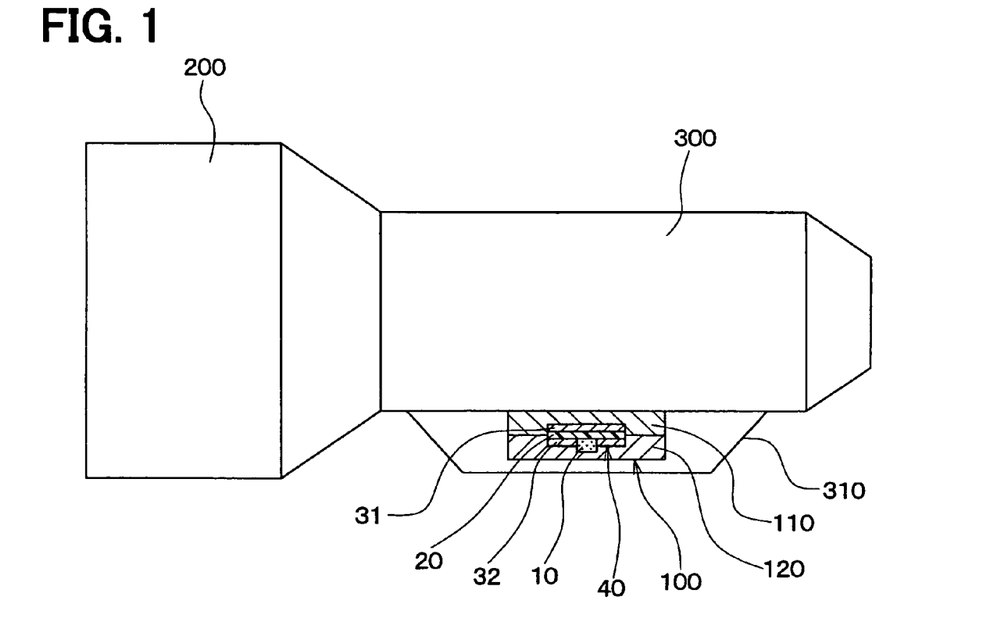
FIG. 1 is an overview schematic cross-sectional view of a mounting structure of a pressure sensor element according to a first exemplary embodiment.

Referring now to FIG. 1, an overview schematic cross-sectional view showing a profile of a mounting structure of a pressure sensor element of a first exemplary embodiment will be discussed and described.

In present embodiment, an example object having a pressure to be measured is an automatic transmission (AT) control module 100 for controlling oil pressure of an automatic transmission 300 of a vehicle. A pressure sensor element 10 measures oil pressure in this AT control module 100.

As shown in FIG. 1, the AT control module 100 is the object with a pressure to be measured. The AT control module 100 is received in the inside of an oil pan 310 attached to the automatic transmission 300 installed in an engine 200.

A sensor structure 40 includes the pressure sensor element 10, a flexible printed wiring board 20 and gaskets 31, 32. The sensor structure 40 is built in the inside of the AT control module 100.

Also illustrated in FIG. 1 are an upper part component 110 and a bottom component 120, discussed in more detail in connection with FIG. 2.

Figure 2:
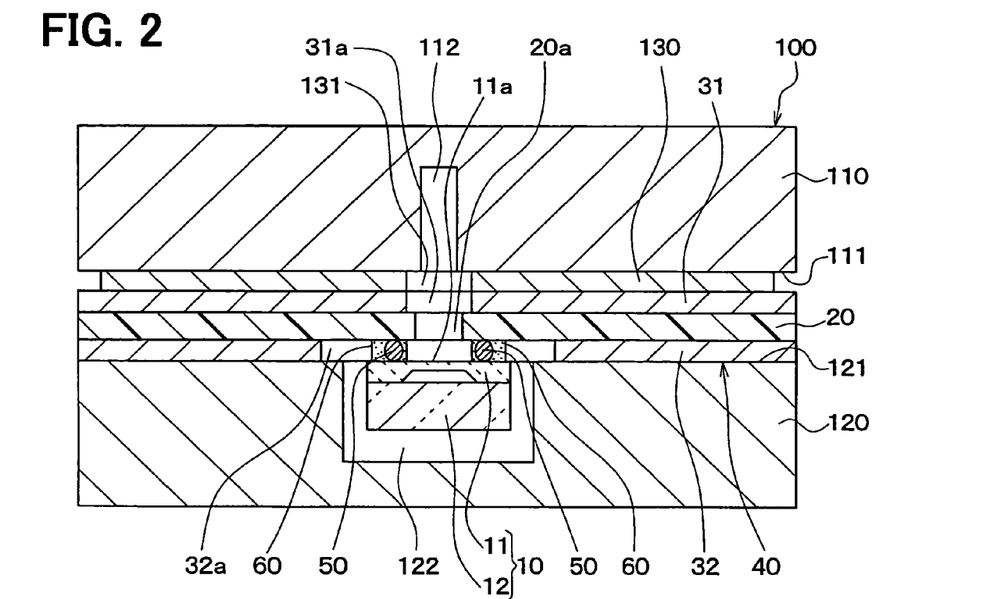
FIG. 2 is a detailed sectional view of a mounting structure of the pressure sensor element of the first embodiment.

Referring now to FIG. 2, a detailed sectional view of a mounting structure of the pressure sensor element of the present embodiment will be discussed and described. As shown in FIG. 2, the AT control module 100 conventionally includes an upper part component 110 as a first member, and a bottom component 120 as a second member. The upper part component 110 has a bonding face 111, and the bottom component 120 has a bonding face 121. The upper part component 110 and the bottom component 120 can be bonded in contact with their respective bonding faces 111, 121 facing each other. The upper part component 110 and the bottom component 120 can be tightened by screw members (not illustrated).

In accordance with various embodiments, the AT control module 100 includes an upper part medium passageway 112 and a bottom medium passageway 122 formed on respective bonding faces 111, 121 of the upper part component 110 and the bottom component 120. Transmission oil as a pressure medium can flow through the medium passageways 112, 122. The medium passageways 112, 122 are formed on the bonding face 111, 121 as a recess. The cross-section of the medium passageways 112, 122 can have different shapes, for example the upper part medium passageway 112 can have a longer depth than width, and the bottom medium passageway can have a shorter depth than width, as illustrated. The medium passageways 112, 122 can form a labyrinth from one side of the AT control module 100 to the other side.

In addition, a separate plate 130 can be interposed between the bonding faces 111, 121. The separate plate 130 can be made of iron, for example.

The separate plate 130 can divide the bottom medium passageway 122 formed on the bottom component 120 from the upper part medium passageway 112 formed on the upper part component 110. The separate plate 130 is a conventional member of the AT control module 110.

In this embodiment, the oil as a pressure medium can flow between the upper part medium passageway 112 and the bottom medium passageway 122 through a hole 131 formed in the separate plate 130.

The sensor structure 40 is interposed where a portion of oil flows between the upper medium passageway 112 and the bottom medium passageway 122, between the upper component 110 and the bottom component 120.

The sensor structure 40 includes a flexible printed wiring board 20 interposed between both bonding faces 111, 121. An upper gasket 31 is provided on top of the sensor structure 40, interposed between the flexible printed wiring board 20 and the separate plate 130. A bottom gasket 32 is provided on the bottom of the sensor structure 40, interposed between the flexible wiring board 20 and the bonding face 121 of the bottom component 120. The flexible printed wiring board 20 is made of known material, such as polyimide resin base and a formed copper wiring pattern 21 or the like (illustrated in FIG. 3).

The upper gasket 31 of the side of the upper part component 110 is interposed between the printed wiring board 20 and the separate plate 130 on the bonding face 111 of the upper component 110. The bottom gasket 32 of the side of the bottom component 120 is interposed between the bonding face 121 of the bottom component 120 and faces the flexible printed wiring board 20. The gaskets form a seal between the respective bonding faces 111, 121 of the upper part component 110 (and optional separate plate 130) and the bottom component 120, and the flexible wiring board 20.

The upper and bottom gaskets 31, 32 can be made of material such as resin, rubber materials, metal and the like. Furthermore, each gasket 31, 32 can have flexible elasticity sufficient to absorb an unevenness of the wiring pattern 21 printed on the wiring board 20, and to absorb an unevenness of each bonding face 111, 121. A medium introduction hole 31a, discussed in more detail below, can be provided in the gasket 31 to allow the medium to flow from one side of the gasket 31 through to the other side of the gasket 31.

The hole 131 in the separate plate 130 is disposed to communicate between the upper part medium passageway 112 and the bottom medium passageway 122. In the illustrated embodiment, the hole 131 has a diameter at least as large as a diameter of the upper part medium passageway 112 on the bonding face 111, and in this case a diameter coextensive with the diameter of the medium introduction hole 31a in the upper gasket 31.

Figure 4:
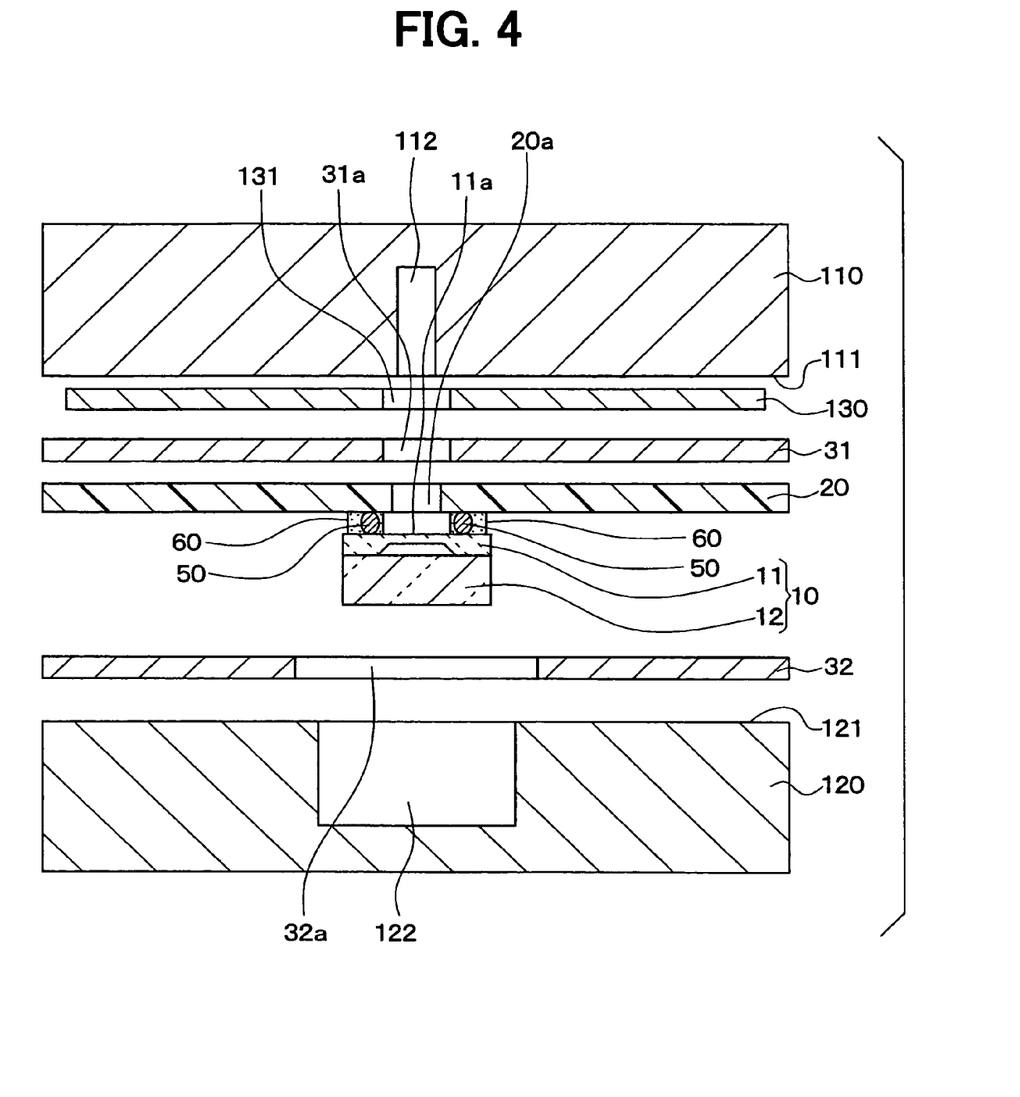
FIG. 4 is an exploded cross-sectional view illustrating the mounting structure of the first embodiment.

Here, as shown in both FIG. 2 and FIG. 4, an opening portion 32a is formed in the bottom gasket 32. The pressure sensor element 10 is electrically connected to connecting members 50 formed on the flexible printed wiring board 20 through the opening portion 32a. The opening portion 32a has a width larger than a width of the bottom medium passageway 122, to allow pressure medium to flow from the bottom medium passageway 122 into the opening portion 32a. The pressure medium can then flow between the connecting members, to reach the opening portion 20a of the flexible printed wiring board 20.

The pressure sensor element 10 can be an absolute pressure type pressure sensor element. Advantageously, the pressure sensor element 10 includes a semiconductor diaphragm-type sensor chip 11 and a glass pedestal 12 bonded to the sensor chip 11 by anode joining.

The sensor chip 11 can be manufactured on a semiconductor substrate such as a silicon semiconductor substrate. A concave recess portion can be formed on the backside thereof by chemical etching, and can be thin-walled at the surface corresponding to this concave recess portion, to form a diaphragm. The surface of this diaphragm provides a pressure receiving face 11a, receiving the oil pressure.

The sensor chip 11 can be sealed to the glass pedestal 12 to make a standard pressure cavity for the pressure sensor element 10, so that the pressure receiving face 11a receives pressure and experiences distortion. The sensor chip 11 outputs a signal based on the distortion utilizing a piezo resistance effect in accordance with known techniques.

Figure 3:
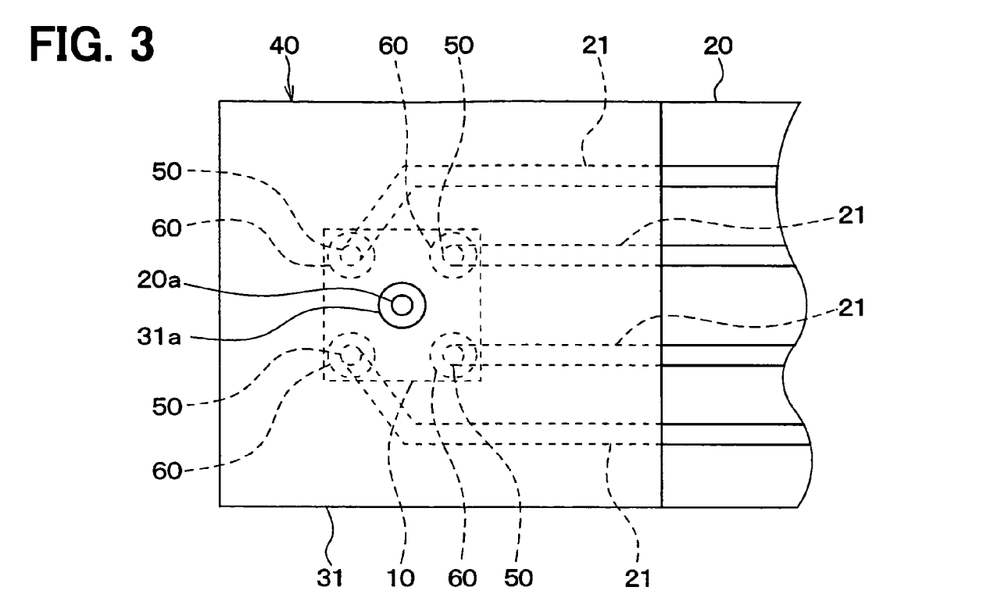
FIG. 3 is a schematic plan view of the sensor structure shown in FIG. 2.

As shown in both FIG. 2 and FIG. 3, the pressure sensor element 10 is connected with the flexible printed wiring board 20 through the connecting member 50 where the pressure receiving face 11a faces the flexible printed wiring board 20. The pressure receiving face 11a, opposite the concave recess portion, faces the flexible printed wiring board 20. Insulating members 60 can also be provided around respective connecting members and are discussed in more detail below.

Referring now to FIG. 3, a schematic plan view showing the sensor structure 40 of FIG. 2 will be discussed and described. As shown in FIG. 3, a wiring pattern 21 formed on the flexible printed wiring board 20 electrically connects the pad (not shown) of the sensor chip 11 via the connecting member 50.

The connecting member 50 is made of material such as a gold bump joined by a supersonic wave, a solder bump, or a conductive adhesive material. Even more particularly, the circumference of the connecting member 50 between the sensor chip 11 and the flexible printed wiring board 20 can be sealed by the insulating members 60 such as epoxy-type resin, where the insulating members 60 are disposed between the pressure sensor element 10 and the flexible printed wiring board 20.

In this embodiment, the connecting members 50 are sealed by the insulating member 60 so that the bonding strength of the connecting members 50 is reinforced and the connecting members 50 are electrically isolated from each other.

The insulating members 60 may alternatively be applied after the pressure sensor element 10 is connected to the flexible printed wiring board 20 with the connecting members 50. Alternatively, the insulating members 60 may be applied before the pressure sensor element 10 is connected.

For example, in the case of applying before the connection is made, the connecting member 50 can be a gold bump, the bump being formed on the pressure sensor element 10, and the insulating material 60 being disposed on the flexible printed wiring board 20. After that, a supersonic wave can bond the insulating material 60 to the bump being created thereby, and the insulating material 60 then becomes hardened.

Referring now to FIG. 4, an exploded cross-section view illustrating the mounting structure of the first embodiment will be discussed and described. The medium introduction hole 31a is formed in the upper gasket 31, and a medium introduction hole 32a is formed in the bottom gasket 32 to introduce oil as a pressure medium from the upper and lower medium passageways 112, 122 to the pressure sensor element 10.

The medium introduction hole 31a is formed in an area of the upper part gasket 31 corresponding to a hole 131 of the separate plate 130. A periphery of the medium introduction hole 31a can be contiguous to a periphery of the hole 131 of the separate plate 130. This medium introduction hole 31a is connected to and communicates with the upper part medium passageway 112.

Even more particularly, the pressure sensor element 10 is disposed at a side of the flexible printed wiring board 20 opposite to the medium introduction hole 31a of the upper part gasket 31. The flexible printed wiring board 20 has an opening portion 20a positioned to communicate with the medium introduction hole 31a.

The pressure medium can be led by the opening portion 20a of the flexible printed wiring board 20 from the medium introduction hole 31a of the upper part gasket 31 to the pressure receiving face 11a of the pressure sensor element 10.

On the other hand, the opening portion 32a is formed in the bottom gasket 32, and the pressure sensor element 10 is inserted through the opening portion 32a into the bottom medium passageway 122. The opening portion 32a acts as a medium introduction hole and introduces a pressure medium from the bottom medium passageway 122.

The pressure medium is introduced through the opening portion of bottom gasket 32, in the other words, the medium introduction hole 32a, from a gap between the connecting members 50 to the pressure receiving face 11a.

In addition, it is preferable that the direction of flow between the upper part medium passageway 112 and the bottom medium passageway 122 is either up (from the bottom medium passageway 122 to the upper part medium passageway 112) or down (from the upper part medium passageway 112 to the bottom medium passageway 122).

When the flow is down, that is, from the upper part medium passageway 112 to the bottom medium passageway 122, a pressure medium is introduced from the medium introduction hole 31a of upper part gasket 31 to the medium introduction hole 32a of bottom gasket 32. On the other hand when the flow is up, that is, from the bottom medium passageway 122 to the upper part medium passageway 112, a flow is opposite to that described above.

In other words, in the present embodiment, the medium passageways 112, 122 are formed on both bonding faces 111, 121 of the upper part component 110 and the bottom component 120. Therefore, the respective medium introduction holes (opening portion) 31a, 32a are formed in the upper and lower gasket 31, 32 to correspond to the two flows described above.

Therefore, when the oil pressure in the AT control module 100 is introduced to the pressure receiving face 11a of pressure sensor element 10, the pressure signal corresponding to the pressure is outputted from the pressure sensor element 10 to the flexible printed wiring board 20 through the connecting member 50.

Although not shown, the flexible printed wiring board 20 can be connected electrically with an electric wiring part of the AT control module 100. Moreover, the pressure signal can be sent from the flexible printed wiring board 20 to a circuit part in the AT control module 100, and the pressure signal can be used for oil pressure control.

As shown in FIGS. 2 and 4, the pressure sensor element 10 projects through and protrudes from the opening portion 32a of the bottom gasket 32, and is received in the bottom medium passageway 122. The bottom medium passageway 122 is a recess formed on the bonding face 121 of the bottom component 120.

In other words, the bottom medium passageway 122 is the recess formed on the bonding face 121 of the bottom component at a position corresponding to the pressure sensor 10, and the sensor element 10 is received in the recess 122.

The bottom medium passageway 122 is formed on the bonding face 121 of the bottom component 120, this bottom medium passageway 122 serves as the recess receiving the pressure sensor element 10.

Installation of the pressure sensor element can be performed at the same time that the upper part component 110 and the bottom component 120 are disposed in AT control module 100. FIG. 4 is an exploded cross-sectional view of this mounting structure showing each part.

At first the flexible printed wiring board 20 is bonded with the pressure sensor element 10. Then, both surfaces of the flexible printed wiring board 20 are interposed between respective gaskets 31, 32. The gaskets 31, 32 (with the flexible printed wiring board 20 therebetween) are disposed between the respective upper part component and the bottom component 110, 120.

The flexible printed wiring board 20 is electrically connected to the AT control module 100.

Successively, both components 110, 120 are fixed to each other by a screw closure (not shown) or the like. For example, the screw closing can performed as in a conventional gasket, by providing a hole for the screw on the gaskets 31, 32.

The combination of the pressure sensor element 10, the flexible printed wiring board 20 and the gaskets 31, 32 are thereby fixed between both bonding faces 111, 121 of the component 110, 120 by the clamping force provided by the screw closing. In this way, the mounting structure of the pressure sensor element of the present embodiment as shown in FIGS. 1, 2 and 3 can be completed.

Now, according to the present embodiment, the AT control module 100 is the object with the pressure to be measured. The AT control module 100 includes the components 110, 120, and the medium passageway 112, 122 on the respective bonding faces 111, 121 of the components 110, 120. The flexible printed wiring board 20, bonded with the pressure sensor element 10, is interposed between the both components 110, 120 though the gaskets 31, 32. The pressure sensor element 10 is mounted in the bottom medium passageway 122, the bottom medium passageway 122 being a recess formed on the bottom component 120. In addition, as above described, an appropriate pressure monitoring can be performed by introducing the pressure medium to the pressure sensor element 10 from the medium introduction holes 31a, 32a formed on the both gaskets 31, 32.

Therefore the present invention does not need a conventional case for receiving the pressure sensor 10. The pressure sensor element 10 can be disposed in the inside of the AT control module 100, or other object with the pressure to be measured, without changing a product profile.

As thus described construction, the present invention provides the pressure sensor 10 as a simplified and miniaturized component, which can be disposed in the AT control module 100.

The ability to save space in an engine room of an automotive car is a big advantage. Recently, the automotive industry is frequently requested to use space under a hood to absorb an impact. Although it is difficult to improve the conventional structure where a pressure sensor protrudes from the object with a pressure to be measured, the illustrated mounting structure can make such space easily.

In addition, in a conventional system, a thermal expansion coefficient of the pedestal glass 12 and the case mounted the pedestal glass 12 are different, so that the case expands or shrinks when a temperature change occurs. The glass pedestal 12 needs some depth in order to suppress the stress that will be applied to the pressure sensor element 10. However, in the present embodiment, the glass pedestal 12 can be thinner than in the conventional system because the pedestal glass 12 is not in contact with the other member. And, as a result, the pressure sensor element 10 can be miniaturized and weight can be saved.

A Second Embodiment

Figure 5:
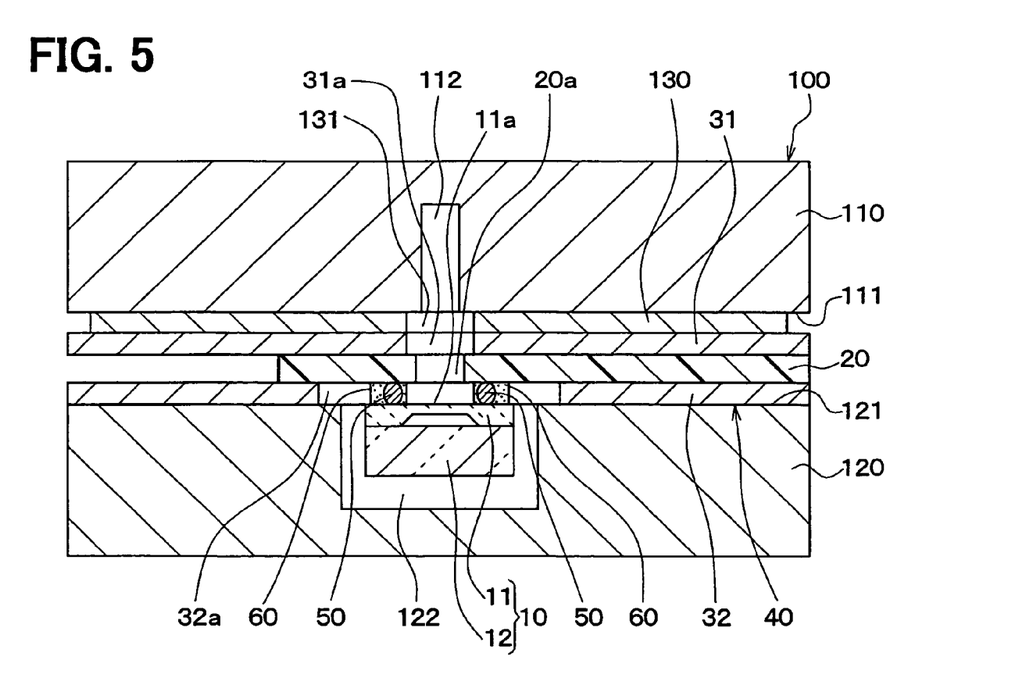
FIG. 5 is a detailed sectional view of the mounting structure of the pressure sensor element according to a second embodiment.
Figure 6:
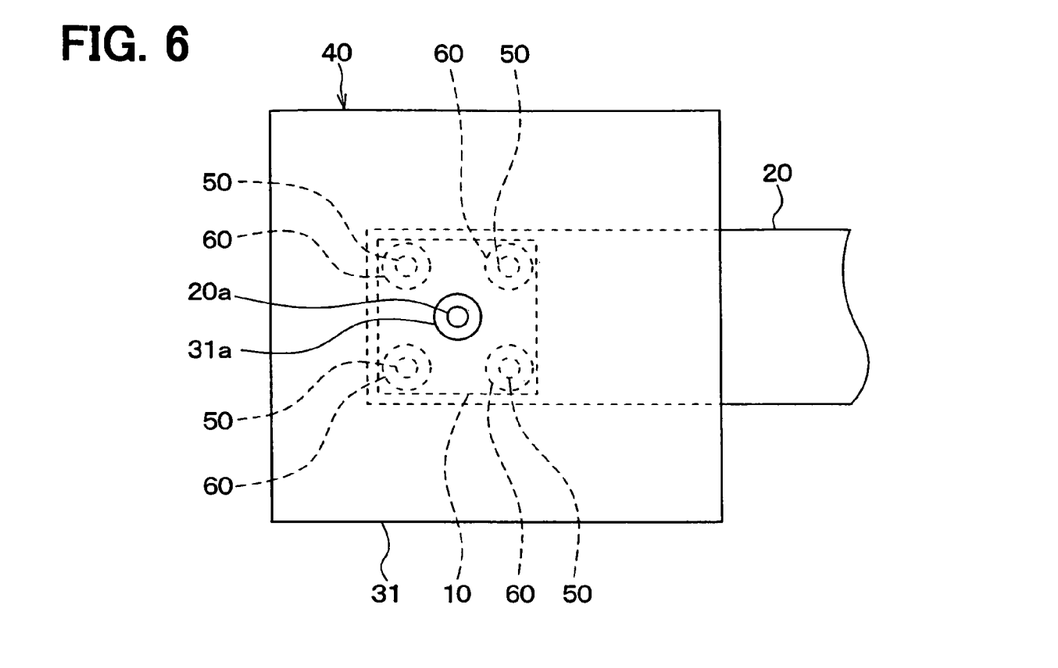
FIG. 6 is a schematic plan view of the sensor structure shown in FIG. 5.

The second embodiment is illustrated in FIG. 5 and FIG. 6. FIG. 5 provides a sectional view of a sensor structure, whereas FIG. 6 provides a schematic plan view of the sensor structure shown in FIG. 5. Elements which were discussed above have been omitted below for clarity of discussion.

Referring now to FIG. 5, a detailed sectional view of the mounting structure of the pressure sensor element according to a second embodiment will be discussed and described. In comparison to the first embodiment, illustrated in FIG. 2, the second embodiment utilizes a flexible printed wiring board 20 which has an area that is smaller than the area of the gaskets 31, 32. For this case, the operation/working-effect can be expected to be the same as the first embodiment Referring now to FIG. 6, a schematic plan view of the sensor structure shown in FIG. 5 will be discussed and described. The wiring pattern 21 of the flexible printed wiring board 20 is not illustrated in FIG. 6 to avoid obscuring the principals discussed herein. In comparison to the first embodiment illustrated in FIG. 3, the flexible printed wiring board 20 occupies a smaller area than the gasket 31. In the first embodiment, the flexible printed wiring board 20 is contiguous to and coextensive with the gasket 31, and extends to the right of the illustration beyond the gaskets. In contrast, in the second embodiment, the flexible printed wiring board 20 does not extend to the periphery of the gaskets.

A Third Embodiment

Figure 7:
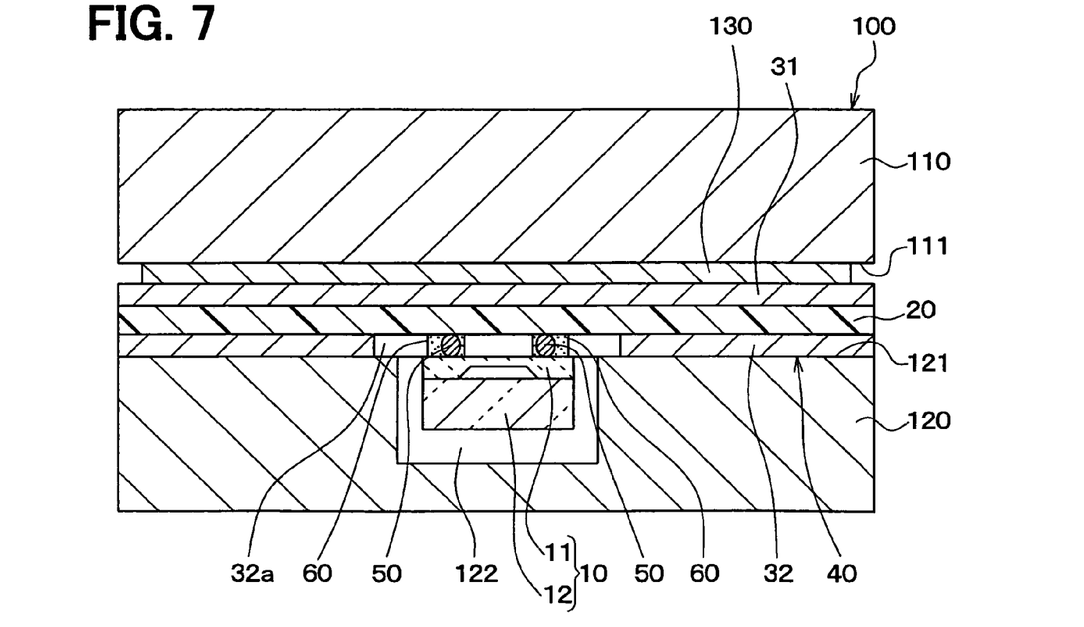
FIG. 7 is a detailed sectional view of a mounting structure of the pressure sensor element according to a third embodiment.

Referring now to FIG. 7, a detailed sectional view of a mounting structure of the pressure sensor element according to a third embodiment will be discussed and described. Elements which were discussed above have been omitted below for clarity of discussion. As an alternative to the medium passageways 112, 122 formed on both the bonding face 111 of the upper part component 110 and the bonding face 121 of the bottom component 120, the medium passageway be formed on either one of the bonding faces 111, 121.

For example, as shown in FIG. 2, the medium passageways 112, 122 are formed on both bonding faces 111,121 of the upper part component 110 and the bottom component 120. Also, the medium introduction holes 31a, 32a are formed on the upper and lower gaskets 31, 32.

The upper part medium passageway 112 is not formed as the medium passageway to transfer a pressure medium, and the bottom medium passageway 122 is formed. For this variation, the following constitution can be adopted.

In FIG. 2, the pressure medium is led from the upper part medium passageway 122, through the medium introduction hole 31a of the upper gasket 31, then through the opening portion 20a of the flexible printed wiring board 20, to the pressure receiving face 11a of the pressure sensor element 10. Therefore the pressure sensor element 10 can monitor the pressure.

On the other hand, although a recess is provided which serves as the bottom medium passageway 122 in above case, it should be a size sufficient to receive the pressure sensor element 10; the recess does not have to be shaped so as to allow the flow of the medium.

FIG. 7 shows that the only medium passageway is the bottom medium passageway 122 formed in the bonding face 121 of the bottom component 120. The above described medium introduction hole of the upper part gasket 31 and the opening portion 20a of the flexible printed wiring board 20 become needless in the embodiment. In addition, the bottom medium passageway 122 operates as a recess for receiving the pressure sensor element 10.

A pressure medium flows from the bottom medium passageway 122 to the medium introduction hole 32a, the medium introduction hole 32a being an opening in the bottom gasket 32; then the pressure medium flows to the pressure receiving face 11a of the pressure sensor element 10. Thereby, the pressure sensor element 10 can monitor the pressure.

Other Embodiments

In addition, the pressure receiving face 11a of the pressure sensor element 10 does not need to face the flexible printed wiring board 20, as shown in each illustrated embodiment. The pressure detection should be enabled by providing at least one of the medium introduction holes of the both gaskets 31, 32 which introduce a pressure medium from the medium passageway to the pressure sensor element 10.

The flexible printed wiring board 20 and the gasket 31, 32 may be adhesively bonded together through glue or other adhesives.

Alternatively, although the above examples show that the circumference of the connecting member 50 is sealed by the insulating member 60 between the pressure sensor element 10 and the flexible printed wiring board 20, the insulating member 60 can be omitted. As another alternative, it is not necessary that the insulating member 60 use a material with insulating properties.

Although the illustrated AT control module 100 includes two components such as the upper and lower component in above embodiment, three or more components can be included. In the case, the sensor structure 40 can be interposed between two or more of the components.

Finally, the object with a pressure to be measured is not limited to the AT control module of an automatic transmission. For example, the object may be a Continuously Variable Transmission (CVT) control module.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A mounting structure of a pressure element to be mounted to an object with a pressure to be measured, the object having a medium passageway from which a pressure medium is introduced to the pressure element, comprising:

a first member of an object with a pressure to be measured, the first member having a first bonding face;

a second member of the object, the second member having a second bonding face, the first bonding face facing the second bonding face, a medium passageway being formed on at least one of the first and second bonding faces;

a flexible printed wiring board interposed between the first bonding face and the second bonding face;

a first gasket interposed between the first bonding face and the flexible printed wiring board;

a second gasket interposed between the second bonding face and the flexible printed wiring board, an opening portion being formed in the second gasket;

a pressure sensor element electrically connected to the flexible printed wiring board by an electrically conductive member through the opening portion, the pressure sensor element having an electrical connection to be connected to an outside of the object;

a recess formed on the second bonding face opposite to the pressure sensor element, the pressure sensor element being received in the recess or the opening portion of the second gasket; and a medium introduction hole formed at least on one of the first gasket and second gasket, communicating the medium passageway to the pressure sensor element.

2. The mounting structure according to claim 1, wherein the medium passageway is formed on the bonding face of the first member, wherein the medium introduction hole is formed on the first gasket.

3. The mounting structure according to claim 2, wherein the pressure sensor element includes a pressure receiving face, and the pressure receiving face faces the flexible printed wiring board, wherein the medium introduction hole is formed on the first gasket, wherein an opening portion is formed on the flexible printed wiring board communicating the medium introduction hole to the pressure receiving face.

4. The mounting structure according to claim 1, wherein the medium passageway is formed on the second bonding face, wherein the recess is formed in the medium passageway of the second member.

5. The mounting structure according to claim 4, wherein the pressure sensor element includes a pressure receiving face, and the pressure receiving face is faces the flexible printed wiring board, wherein an opening portion formed on the second gasket is used as the medium introduction hole for introducing the pressure medium from the medium passageway of the second member.

6. The mounting structure according to claim 5, wherein the electrically conductive member between the pressure sensor element and the flexible printed wiring board is sealed by insulating material.

7. The mounting structure according to claim 1, wherein the object is a control module for controlling oil pressure of an automatic transmission of a vehicle.

8. The mounting structure according to claim 1, wherein a perimeter of the medium introduction hole is coextensive with a perimeter of the opening.

9. The mounting structure according to claim 1, further comprising a plate between the first bonding face and the first gasket.

10. A method of measuring a pressure by a pressure sensor of a pressure medium in a medium passageway formed in an object installed in an engine, the presser sensor including a pressure element and a flexible printed wring board being connected to the pressure element, the object having a first member with a first bonding face and a second member with a second bonding face, the first bonding face facing the second bonding face, a medium passageway being formed on at least one of the first and second bonding faces, the method comprising:

providing a flexible printed wiring board interposed between the first bonding face and the second bonding face; a first gasket interposed between the first bonding face and the flexible printed wiring board; a second gasket interposed between the second bonding face and the flexible printed wiring board, an opening portion being formed in the second gasket; a pressure sensor element electrically connected to the flexible printed wiring board by an electrically conductive member through the opening portion, the pressure sensor element having an electrical connection to be connected to an outside of the object; a recess formed on the second bonding face opposite to the pressure sensor element, the pressure sensor element being received in the recess; a medium introduction hole formed at least on one of the first gasket and second gasket, communicating the medium passageway to the pressure sensor element;

generating a pressure medium in the medium passageway in the automatic transmission;

receiving the pressure medium in the medium passageway from the opening portion, to a pressure receiving face on the pressure sensor element; and generating, from the pressure sensor element, a pressure signal corresponding to a pressure of the pressure medium received at the receiving face.

11. The method according to claim 10, wherein the medium passageway is formed on the second bonding face, wherein the pressure sensor is received in the medium passageway.

12. The method according to claim 11, wherein the object is an automatic transmission.

13. The method according to claim 12, wherein the medium passageway is a labyrinth of the automatic transmission, the pressure medium flowing through the labyrinth.

* * * * *